US012619503B2

(12) United States Patent
Dash et al.

(10) Patent No.: US 12,619,503 B2
(45) Date of Patent: May 5, 2026

(54) END-TO-END DATA VALIDATION FOR BACKUP SYSTEMS

(71) Applicant: Rubrik, Inc., Palo Alto, CA (US)

(72) Inventors: Prasanta Ranjan Dash, San Jose, CA (US); Abdullah Reza, Pleasanton, CA (US); Arjun Sinha, Mountain View, CA (US); Vinita Sharma, Bengaluru (IN); Saurabh Vashisth, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/756,288

(22) Filed: Jun. 27, 2024

(65) Prior Publication Data

US 2026/0003739 A1     Jan. 1, 2026

(51) Int. Cl.
*G06F 11/14* (2006.01)
*G06F 11/07* (2006.01)
*G06F 11/1446* (2026.01)

(52) U.S. Cl.
CPC ...... *G06F 11/1464* (2013.01); *G06F 11/0772* (2013.01); *G06F 11/1451* (2013.01)

(58) Field of Classification Search
CPC ............. G06F 11/1464; G06F 11/0772; G06F 11/1451
See application file for complete search history.

(56) References Cited

U.S. PATENT DOCUMENTS

| | | | |
|---|---|---|---|
| 11,030,063 B1 * | 6/2021 | Shipilov | ................. G06F 3/067 |
| 11,606,104 B1 * | 3/2023 | Segal | .................. G06F 11/1415 |
| 2024/0054045 A1 * | 2/2024 | Liu | ...................... G06F 11/1004 |
| 2024/0103919 A1 * | 3/2024 | Karr | ........................ G06F 16/00 |

* cited by examiner

*Primary Examiner* — Bryce P Bonzo
*Assistant Examiner* — Xinyuan Yu
(74) *Attorney, Agent, or Firm* — Holland & Hart LLP

(57) ABSTRACT

Methods, systems, and devices for data management are described. The method may include obtaining a first fingerprint of one or more first data blocks obtained from a source data system, where the one or more first data blocks correspond to one or more data objects and are in accordance with a first storage format, obtaining, a second fingerprint of one or more second data blocks as stored in the backup system, where the one or more second data blocks correspond to the one or more data objects and are stored in the backup system in accordance with a second storage format, and comparing, in accordance with a mapping between data objects of the source data system and data blocks in the backup system, the first fingerprint and the second fingerprint to validate whether the one or more data objects are stored correctly at the backup system.

18 Claims, 9 Drawing Sheets

Figure 7:
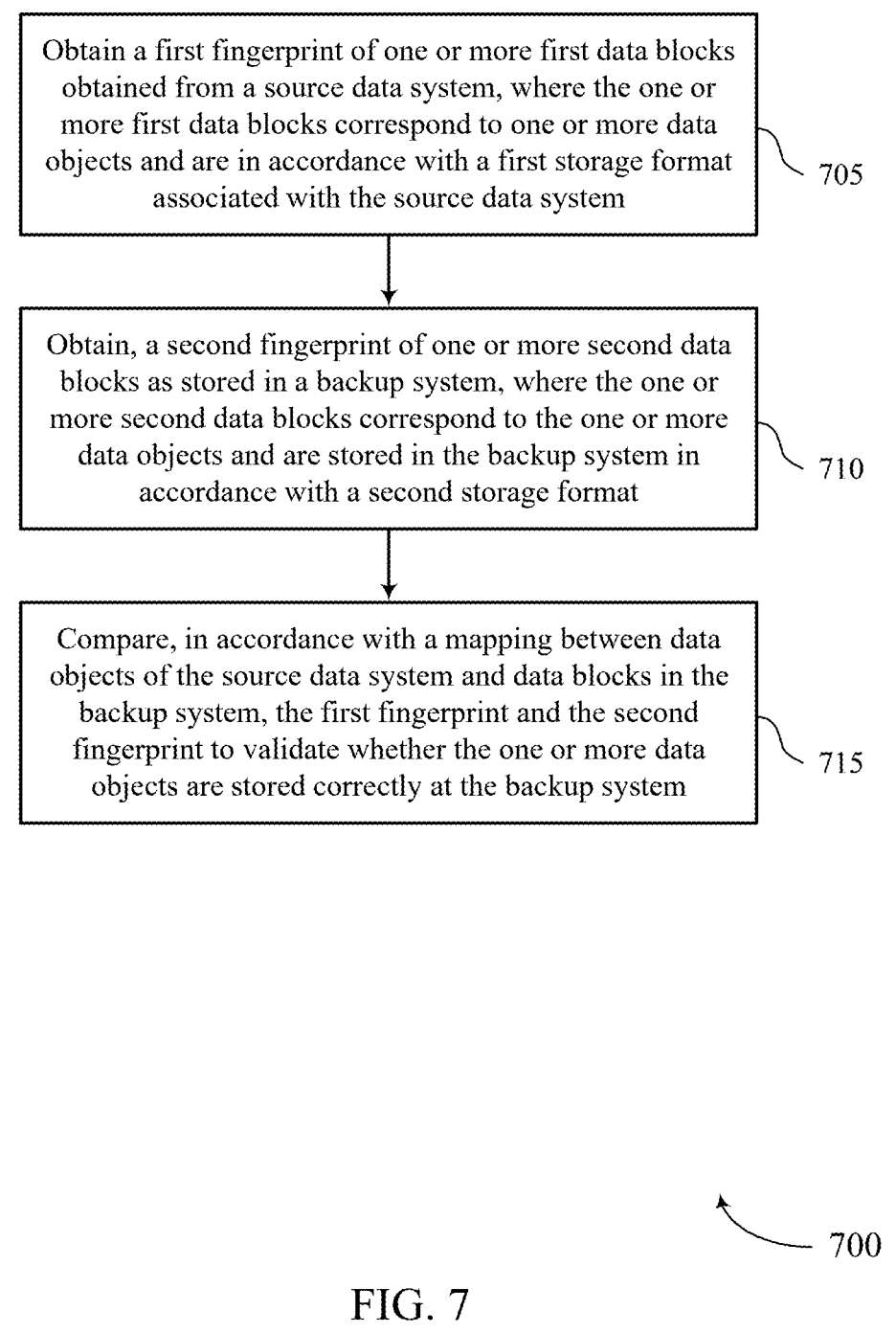

Obtain a first fingerprint of one or more first data blocks obtained from a source data system, where the one or more first data blocks correspond to one or more data objects and are in accordance with a first storage format associated with the source data system

705

Obtain, a second fingerprint of one or more second data blocks as stored in a backup system, where the one or more second data blocks correspond to the one or more data objects and are stored in the backup system in accordance with a second storage format

710

Compare, in accordance with a mapping between data objects of the source data system and data blocks in the backup system, the first fingerprint and the second fingerprint to validate whether the one or more data objects are stored correctly at the backup system

Figure 8:
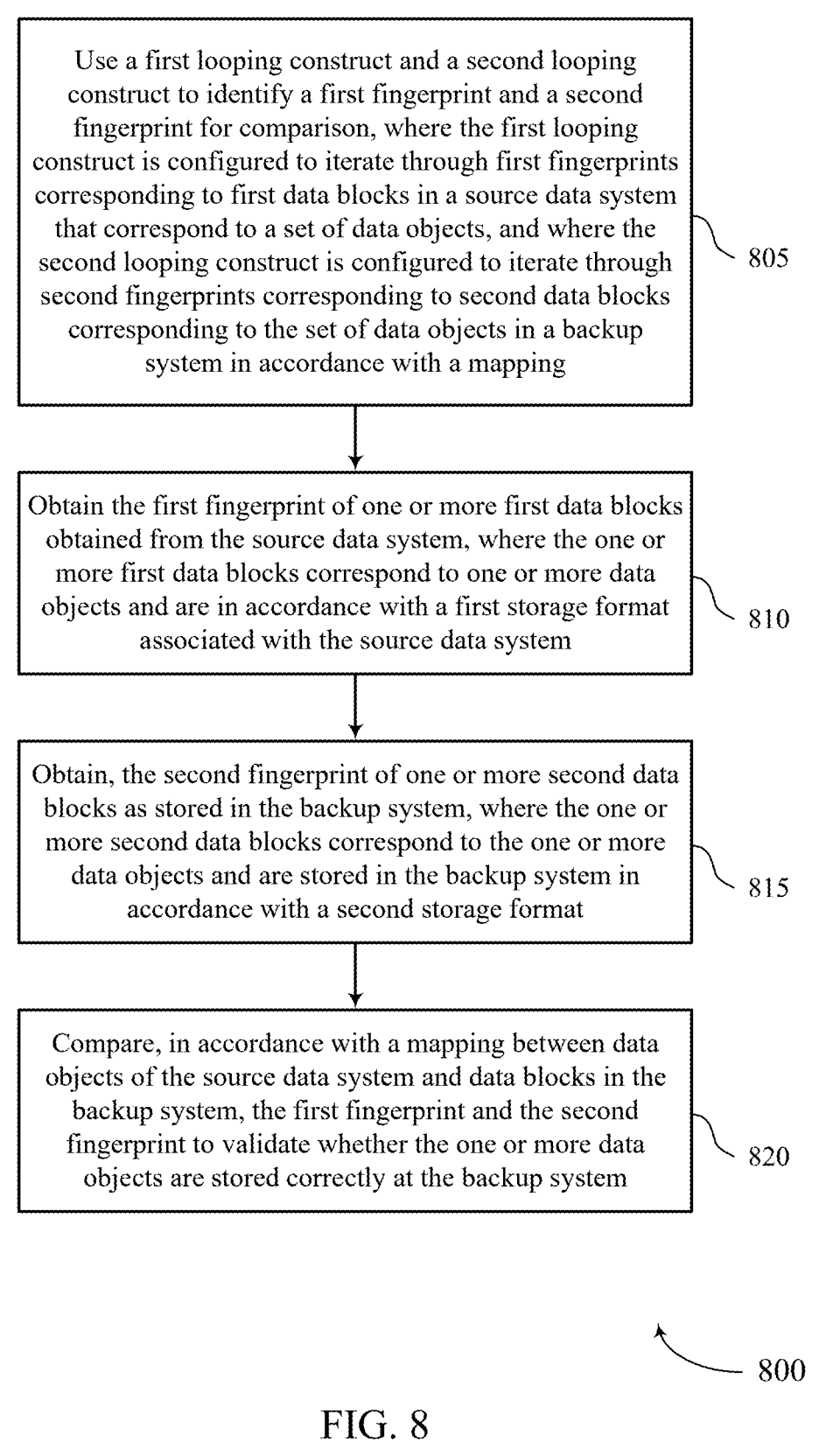

Use a first looping construct and a second looping construct to identify a first fingerprint and a second fingerprint for comparison, where the first looping construct is configured to iterate through first fingerprints corresponding to first data blocks in a source data system that correspond to a set of data objects, and where the second looping construct is configured to iterate through second fingerprints corresponding to second data blocks corresponding to the set of data objects in a backup system in accordance with a mapping

805

Obtain the first fingerprint of one or more first data blocks obtained from the source data system, where the one or more first data blocks correspond to one or more data objects and are in accordance with a first storage format associated with the source data system

810

Obtain, the second fingerprint of one or more second data blocks as stored in the backup system, where the one or more second data blocks correspond to the one or more data objects and are stored in the backup system in accordance with a second storage format

815

Compare, in accordance with a mapping between data objects of the source data system and data blocks in the backup system, the first fingerprint and the second fingerprint to validate whether the one or more data objects are stored correctly at the backup system

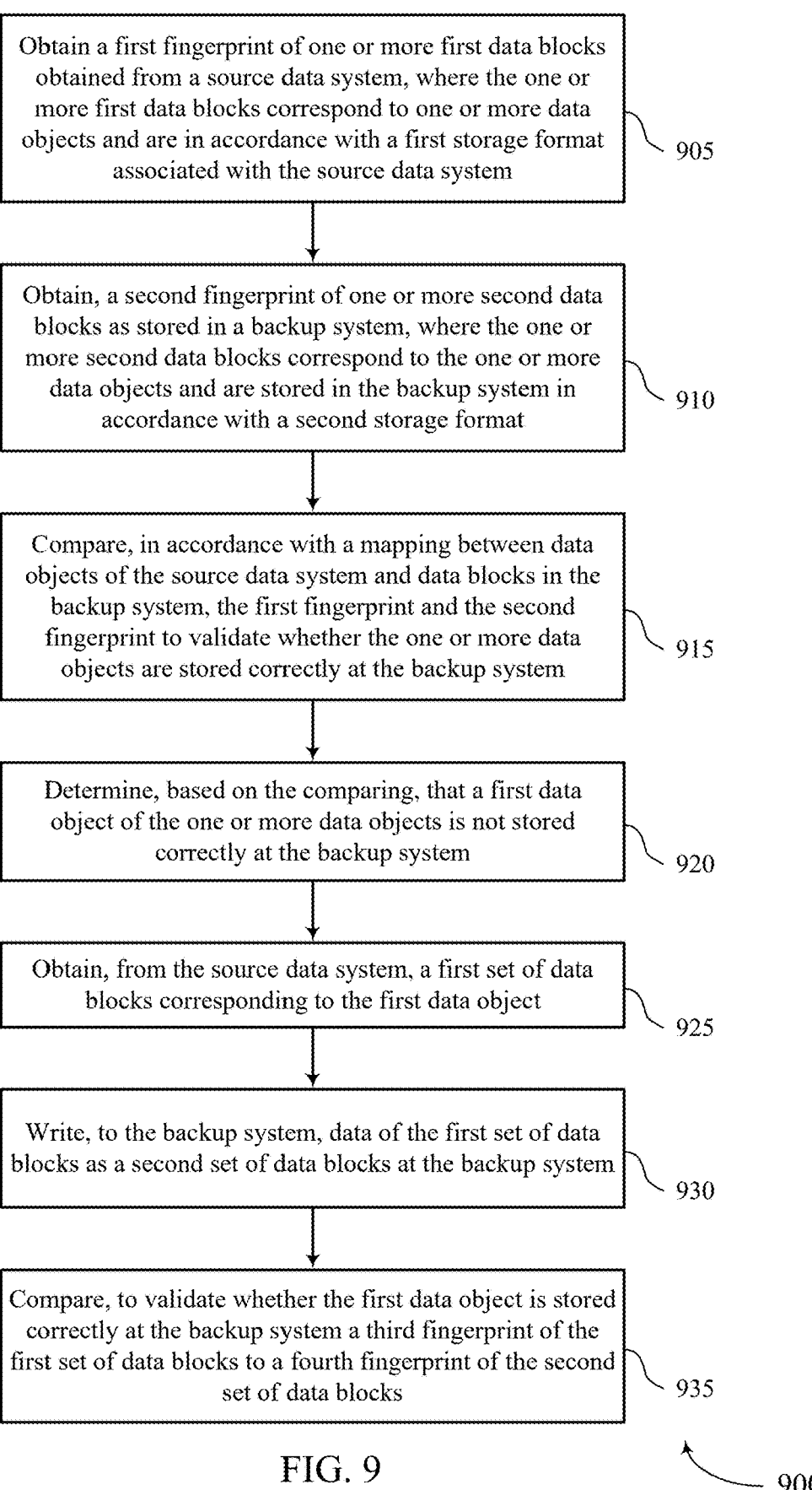
FIG. 9     900

END-TO-END DATA VALIDATION FOR BACKUP SYSTEMS

FIELD OF TECHNOLOGY

The present disclosure relates generally to data management, including techniques for end-to-end data validation for backup systems.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 7 through 9 show flowcharts illustrating methods that support end-to-end data validation for backup systems in accordance with aspects of the present disclosure.

DETAILED DESCRIPTION

Backup systems may protect (e.g., back up) various types of computing objects by reading data from the source system and writing the data to a backup store. The source system may store data in a first format (e.g., windows file system) while the backup system may store the data in accordance with a different format (e.g., a data cluster with multiple devices exposed as a fourth extended file system (EXT4 file system). Additionally, the data may be read from the source in a contiguous manner (e.g., from contiguous storage locations), while the data may be stored in the backup system in a non-contiguous manner due to the use of incremental snapshots, deduplication, sharding/partitioning, etc. As such, performing data validations between data obtained from the source and data written to the target is complex and some related techniques may be computationally inefficient. For example, some techniques may read a snapshot from the source, compute a checksum, write the snapshot to the target, and after the snapshot is completely written, read/mount the snapshot, and compute a checksum. However, computing checksums for large chunks of data after the data has been completely written may be computationally inefficient.

Techniques described herein support a more granular and scalable approach for data validation by a data protection system. The backup system (or an associated component) may maintain a mapping of aspects of data objects as obtained from the source to corresponding data blocks in the backup system, such that fingerprints of smaller chunks/blocks of data may be computed and compared. The validation techniques may be performed as part of the backup procedure and/or a subsequent recovery procedure. Additionally, a first loop construct (e.g., a first iterator function) may be used to track consecutive data blocks/objects read from the source, and a second loop construct (e.g., a second iterator function) may be used to track where corresponding data blocks are written to the target, even if data is not written contiguously to the target. The validation may be performed at various layers in the input/output (I/O) path based on how the data is translated, written, encrypted, deduped, sharded, etc. Additionally, the same fingerprinting algorithm is implemented for the source data and the target data. Data integrity is checked by comparison of data signatures computed in source and target components. These and other techniques are described in further detail with respect to the figures.

Figure 1:
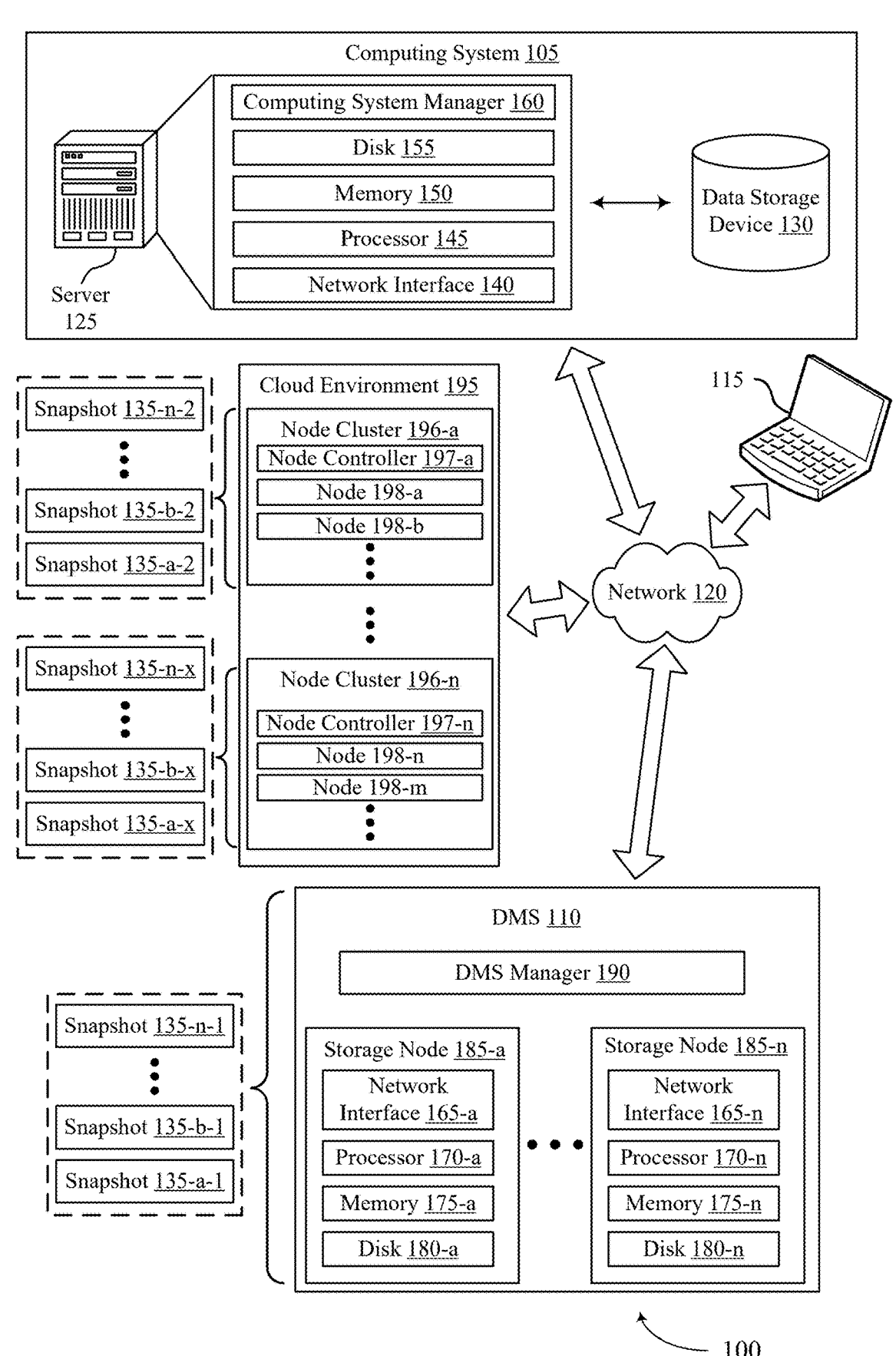
FIG. 1 illustrates an example of a computing environment that supports end-to-end data validation for backup systems in accordance with aspects of the present disclosure.

FIG. 1 illustrates an example of a computing environment 100 that supports end-to-end data validation for backup systems in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

As described herein, the DMS 110 may read or obtain backup data (e.g., snapshots 135) from the computing system 105 and store the backup data to one or more storage devices or systems (e.g., storage nodes 185). In some cases, the data is stored in the computing system 105 in accordance with the first storage format (e.g., a file system format), and the data is stored in the DMS 110 in a second storage format (e.g., block storage format). Additionally, the DMS 110 may perform techniques to improve data storage efficiencies such as deduplication, compression, sharding (e.g., across multiple storage nodes 185), and the like. Some backup systems may perform data validation techniques whereby data is validated after or during writing to the destination. Validation may include comparing a fingerprint of data as stored at the source storage environment (e.g., computing system 105) to a fingerprint of the data as stored at the backup system (e.g., the DMS 110). However, due to differences in storage formats between the source computing environment and the destination platform, as well as storage efficiency techniques performed at the backup system, data validation may be complex and computationally inefficient. For example, a backup system may write an entire snapshot to the backup storage location, read the entire snapshot, compute a fingerprint, and compare the fingerprint to the fingerprint obtained from the source computing environment. However, reading/computing the fingerprint of the entire snapshot may be computationally inefficient and may impact latency and throughput at the backup system.

The DMS 110 may be configured to techniques for validation that are more granular and scalable relative to other implementations. For example, the DMS 110 maintains a mapping of aspects of data objects as obtained from the source to corresponding data blocks in the backup system, such that fingerprints of smaller chunks/blocks of data may be computed and compared. The validation techniques may be performed as part of the backup procedure and/or a subsequent recovery procedure. Additionally, the DMS 110 may implement a first iterator that is used to track consecutive data blocks/objects read from the source, and the DMS 110 may implement a second iterator that is used to track where corresponding data blocks are written to the target, even if data is not written contiguously to the target. The validation may be performed at various layers in the input/output (I/O) path between the computing system 105 and the destination storage location (e.g., the DMS 110, one or more storage nodes 185, one or more node clusters 196 of the cloud environment 195) based on how the data is translated, written, encrypted, deduped, sharded, etc. Additionally, the same fingerprinting algorithm is implemented for the source data and the target data such that the validation or comparison of fingerprints is functional. The data validation techniques are described herein with respect to the DMS 110 performing data validation, but it should be understood that the techniques may additionally or alternatively be performed by other backup systems, such as the cloud environment 195.

Figure 2:
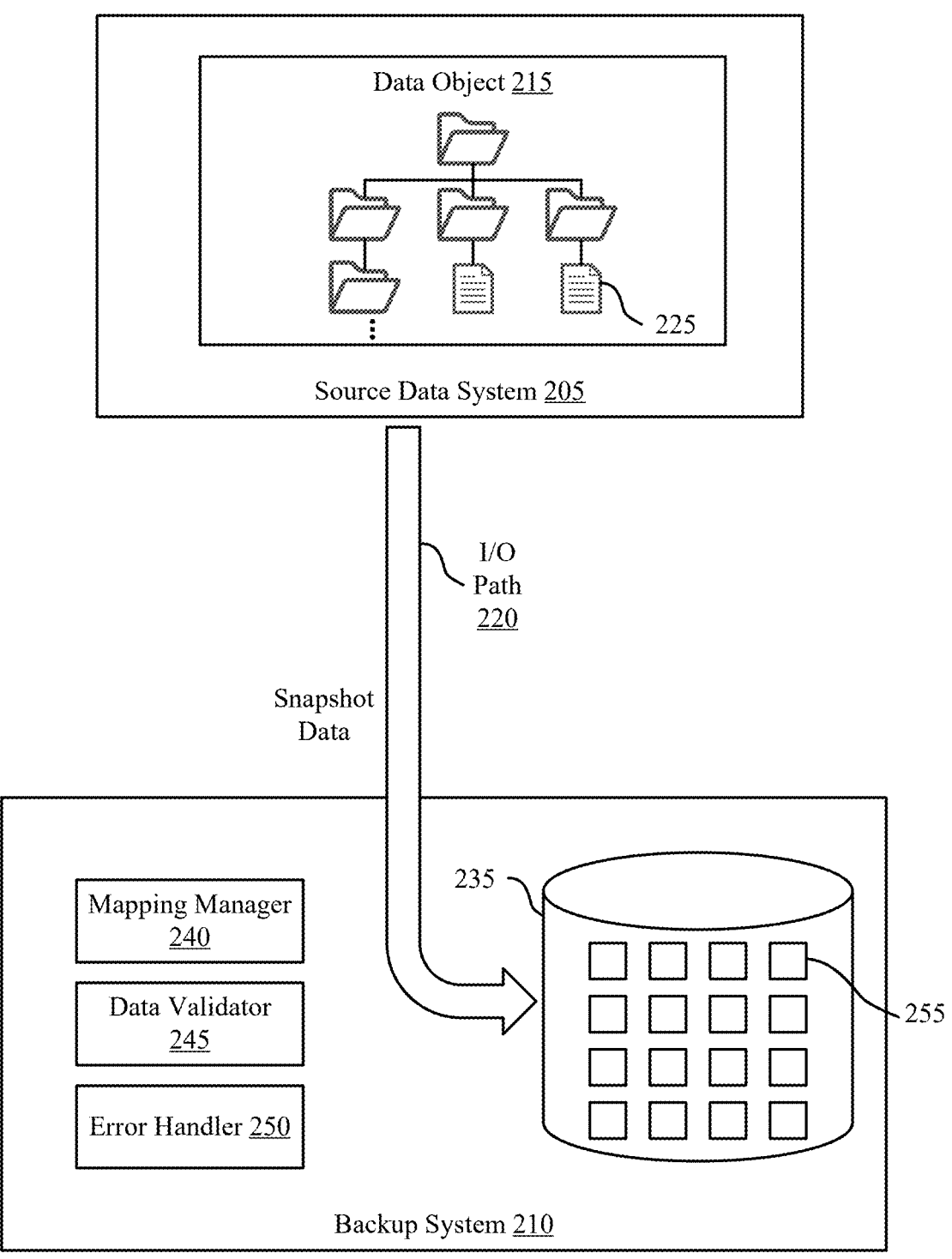
FIG. 2 shows an example of a computing environment that supports end-to-end data validation for backup systems in accordance with aspects of the present disclosure.

FIG. 2 shows an example of a computing environment 200 that supports end-to-end data validation for backup systems in accordance with aspects of the present disclosure. The computing environment 200 includes a source data system 205 and a backup system 210. The source data system 205 may be an example of aspects of the computing system 105 of FIG. 1, and the backup system 210 may be an example of aspects the DMS 110 of FIG. 1, the cloud environment 195 of FIG. 1, or both.

The backup system 210 may provide backup services for various data systems including the source data system 205. For example, the backup system 210 obtains snapshots from the source data system 205 and stores, manages, and/or deploys the snapshot as described herein. The source data system may store data objects (e.g., snappables) in accordance with a first storage format. As illustrated, the data object 215 is stored in a file system format, but it should be understood that other formats are within the scope of the present disclosure. Additionally, the data object 215 is illustrated as encompassing an entire file system, but it should be understood that a computing object may be an example of an individual file, a set of files (e.g., a subset of the file system), the entire file system, and/or multiple file systems. The snapshot of the computing object may be generated and obtained periodically in accordance with a service level agreement (SLA), which may be a collection of configurations (e.g., settings, parameters) according to which backups of the computing objects are generated and maintained (e.g., stored). For example, the backup system 210 may communicate with the source data system 205 to cause generation of and obtain snapshot data, which is communicated along I/O path 220 to be stored in destination storage 235.

The destination storage 235 supported or accessible by the backup system 210 is illustrated as block storage. As such, the backup or snapshot data may be stored in a block storage format, which is different from the file storage format of the source data system 205. It should be understood that the backup system 210 may store the snapshot data via other storage formats.

When making a copy of the data, the integrity of the copy of the data is important. There are often multiple components involved in making a copy of a large dataset in a scalable manner. If there are any software or hardware issues in any of the subsystems, data corruption may occur (e.g., one or more data blocks in the copy of the data differ from the original). It is therefore important to be able to detect and possibly correct data integrity issues. Some components may not have built in data integrity checks, and implementing brute force integrity checks may not scale for large datasets.

Techniques described herein support end-to-end data validation by comparing the data at the source (e.g., source data system 205) with the data at one or more destinations (e.g., destination storage 235). To support scaling for large data sets, the backup system (e.g., a data validator 245) may compare the checksums, digest, or fingerprint of the data rather than the data itself for the purpose of validation. Data may be sharded, deduplicated, and/or compressed for storage efficiency and reliability. The data validation logic implemented by the data validator 245 may break up the dataset into fixed or variable sized units and correlate the source and target blocks to perform the validation. The digest of the data at source and target storage locations may be independently computed and compared by correlating the data blocks. The overall logic may identify the set of data that needs to be validated. For each item in the dataset that is to be validated, the data validator 245 may fetch/track the checksum/fingerprint at the source. If the I/O path includes a component that remaps the data or alters the data placement location, the data validator 245 may use an appropriate function to map the data at various offset ranges to (e.g., <device, handle, offset, length>). If there are more than one such components, cascaded mapping functions may be applied in succession to determine the final location of the data (e.g., in the destination storage 235). After the data validator 245 has computed the location, an appropriate interface/API may be used to compute/get the checksum/fingerprint of the data.

Thus, the backup system 210 may implement the data validator 245 that validates the data stored in the destination storage 235. For example, the data validator 245 may obtain fingerprints or digests of the data as stored at the source data system 205, obtain corresponding fingerprints of the corresponding snapshot data stored at the destination storage 235, and compare the fingerprints to determine whether the data was stored correctly at the backup system. As described herein, the storage format of the source data system 205 and the backup system 210 are different, and as such, the backup system 210 may implement a mapping manager 240 to maintain a mapping data as stored in the source data system 205 and the backup system 210.

Thus, the backup system 210, when reading snapshot data, may break up the computing objects (e.g., snappable) into multiple units referred to herein as data blocks. The size of a data block may be dependent on the storage format of the destination storage 235, the size of the destination storage 335, a size of one or more storage devices (e.g., cluster, disk) supporting the destination storage, a storage format of the source data system 205, size of data objects of the source data system, or any combination thereof. For example, a file data object may be divided into multiple data blocks, or multiple files may be distributed across one or more data blocks, and each data block may be stored in a particular location in the destination storage 235. That is, each block of data obtained from the source data system 205 may be copied and stored to a data block (e.g., data block 255) in the destination storage 235.

The backup system 210 may implement a mapping manager 240 to maintain mappings of data objects obtained from the source and storage locations of the corresponding data (e.g., copied data) as stored in the backup system 210. The configuration of the mapping manager 240 may be dependent on the various components or features that make up the backup system 210. As noted above, the I/O path may alter or move data in different ways, and as such, the mapping manager 240 is configured to account for the movement or altering of data. For example, if ext4 is used as destination storage, the mapping manager 240 may leverage APIs provided by ext4. Similarly, the mapping manager 240 may use appropriate interfaces to deal with sharding, journal files, and other storage technologies that are deployed. Mapping may be maintained implicitly or explicitly. Filesystems like ext4/xfs store file to device block mapping in superblock and/or other metadata. For a RAID (redundant array of inexpensive disks) implementation device, an offset within the device may be calculated. More dynamic layouts may use consistent hash to compute the mapping. In some cases, the mapping information might be persisted as data and/or metadata or could be computed using an algorithm or component specific API.

In some cases, the mapping manager 240 may maintain a mapping of the data blocks of a file 225 and the data blocks of the destination storage 235 where the data blocks of the file 225 are written. As such, when the backup system 210 is to validate that the data of the file 225 of the source data system 205 is stored correctly to the destination storage 235, the backup system 210 may obtain one or more first finger-prints of the data blocks of the file 225 (e.g., first fingerprints of the individual data blocks of the file) and one or more second fingerprints of the corresponding data blocks stored to the destination storage 235. The backup system 210 may then compare the one or more first fingerprints to the one or more second fingerprints to validate that the data is correctly stored. In some cases, the source data system 205 may provide the first fingerprints. For example, the backup system 210 may request, from the source data system 205, the first fingerprints based on the size of the data blocks, and the source data system 205 may generate and provide the fingerprints. In some cases, the backup system 210 may install an agent on the source data system, and the agent may be configured to compute the fingerprint or digest. Addi-tionally, or alternatively, the backup system 210 may divide the data objects 215 during or after receipt of the snapshot data and generate and store the fingerprints. In such cases, as the data of the snapshot is received via the I/O path 220, the backup system 210 may generate the fingerprints for the source data. When the data is to be validated, the backup system may retrieve (e.g., from a fingerprint storage loca-tion) the fingerprints of the source data, and fingerprints of the corresponding destination data, and compare the finger-prints for data validation. Thus, for each source data block in the source data map, the mapping manager 240, the data validator 245, or both, may use mapping functions to identify the target data block(s). The data validator 245 may fetch the source and target data signature from the source and target maps respectively using the source/target block details and compare the two signatures (e.g., fingerprints). As described herein, the backup system 210 (e.g., an error hander 250 therein) may invoke a mismatch handler routine and report it as needed.

In some examples, one or more loop constructs (e.g., iterator functions) may use the mapping data to support verifications of data between data stored at the source and the destination storage 235. For example, to validate data for a set of files, a first iterator function may be implemented as follows:

```
for file in (file1, file2, .., fileN)
    for offset in 0 . length/sizeof(file)
        validate(file, offset)
```

An iterator implementation may be configured as follows:

```
iterator = initialize_iterator(file_list)
while iterator is not done
    validate(name(iterator), offset(iterator))
    increment iterator
```

The advantage of using an iterator interface is that it abstracts some of the implementation details. For example, the same iterator interface may be used to validate a set of files or a list of database tables.

For example, a first iterator function may be configured to iterate through first data blocks (e.g., data units) of the data objects (e.g., data object 215) of the source data system 205. That is, the first iterator may iterate through contiguous data blocks of contiguous data objects (e.g., files) in the source data system. For example, the iterators may iterate through logical blocks of data objects, irrespective of how the blocks are stored in the source data system. The mapping manager 240 may also implement a second iterator function that is configured to iterate through second data blocks correspond-ing to the set of data objects in the backup system 210, and the second data blocks may be copies of the data blocks obtained from the source data system 205. In some cases, the second data blocks are non-contiguous. For example, some consecutive data blocks of a file may be stored in a con-tiguous location in the backup system 210, but different files of the source data system 205 may be stored in non-contiguous locations in the backup system 210. Contiguous files may be stored in non-contiguous locations due to various conditions, configurations, or techniques at the backup system 210, such as deduplication and sharding. In some examples, different chunks of a large file are stored at non-contiguous locations in both source and destination/backup systems. If parts of the files are modified over time, then the blocks that were modified at different times might not be in a contiguous location.

Accordingly, the source data block map (e.g., first iterator function) may be an iterator that returns a source data block descriptor and the associated data signature (e.g., fingerprint, checksum), Invoking the get interface in a loop may yield data signature for all blocks for an data item (e.g., data object) in the dataset (e.g., container). The iterator may switch to the next data item and thus handles validation for multiple data items in the dataset. In such cases, the switch could be transparent (as long as it returns the source block descriptor used for mapping) or it may have a callback mechanism to perform bookkeeping (such as tracking num-ber of data items processed). If the signature is computed for fixed block size, the data validator 245 may optionally use the block size to auto increment and keep track of source data block offset, and the block size may be used in conjunction with a callback to limit the need to return source block descriptor on each invocation of iterator. In some cases, multiple iterators may be implemented in a nested manner (e.g., based on the components of the I/O path) such that an outer iterator iterates through data items and an inner iterator handles data blocks of a data item.

Techniques are described herein with respect to iterating through storage blocks at the source data system or the backup system. It should be understood that when referring to iterating through storage blocks, the techniques are appli-cable to iterating through corresponding fingerprints for validating data. Thus, the mapping manager 240 may main-tain mappings of corresponding fingerprints.

Further, the validation of data items using the target data block map (e.g., map for the data stored in the destination storage 235) may also be implemented as an iterator (e.g., second iterator function). While target blocks for two adja-cent source data blocks may not be next to each other, for large data items (e.g., data file for relational database) it may be common to have the target blocks in a cluster. The validator may keep track of the last data block used for comparison to decide whether to obtain the next (target) data block or seek it first. The implementation may use read-ahead, caching, and other techniques to minimize overhead for looking up the data signature for the target data block. The target data block map/iterator function may be config-ured to seek to the logical offset corresponding to a target block or object and read a set of consecutive blocks for retrieving the target fingerprints. Thus, the iterator may be "repositioned" after each seek to a new starting block.

The data validation may be performed by the data vali-dator 245 based on various configurations or conditions. In some cases, the data validation is performed in response to (e.g., during or after) receiving snapshot data from the source data system 205 (e.g., during a backup operation). For example, the snapshot data may be read, by the backup system 210, from the source data system 205, and the backup system 210 may perform various operations before, during, or after writing the snapshot data to the destination storage 235. For example, the backup system 210 may write a subset (e.g., a threshold portion, such as a chunk) of the snapshot data and validate the subset before writing a next subset. Thus, the backup system 210 may write a threshold quantity of files or blocks of files, validate the written blocks, and then write the next blocks from the source data system 205.

In some cases, a host on the source data system 205 may compute the fingerprint (possibly using a backup agent) and provide the fingerprint to the backup system 210 via the I/O path 220 (or control path). For example, the host may read data at 0 to 64K, compute the fingerprint of the data at 0 to 64K and provide the data and the fingerprint to the backup system 210. The host may then read data at 64K to 128K, compute a second fingerprint, and provide the data and fingerprint to the backup system 210. The backup system may receive and write the data, and maintain a mapping of where the data is written such as to compute or generate corresponding checksums for data validation.

As another example of mapping data to the backup system 210, the backup system 210 may map ten files obtained from the source data system 205 to 2 TB partitions of 200 GB each with a separate EXT4 system. In such cases, each file system is abstracted to one device and backed up to a persistent store (e.g., logical storage built on a number of physical devices with virtualization/redundancy). In such cases, once data is written to the persistent store, the persistent store may perform deduplication. Thus, the backup system 210 may maintain the mapping to identify storage locations of the data, such as which device or networked file store the data is stored. In some cases, data on the backup system 210 is encrypted and/or compressed. In such cases, the fingerprints may be computed prior to compression/encryption.

The I/O path 220 may represent various layers where the data is obtained, written, persisted, deduped, etc. In some examples, fingerprints may be computed at multiple layers and validated. Further, the block size and alignment may be maintained across layers. For example, fingerprints are computed for 64K blocks that are aligned across multiple layers. In some cases, fingerprints obtained from the source or based on the source data are stored for later retrieval/validation. The fingerprints may be stored locally on the backup system 210 and/or in a separate system, such as a cloud environment.

As an example, an xt4 system may have block size of 4K or 8K. Thus, 64K alignment is not assured across layers. For large files, filesystems may allocate one or more extents for the file thus increasing the possibility that it would be aligned. To maximize the chance that file blocks may be aligned with fingerprint block size one or more of the following techniques may be used.

1. Set filesystem block size to fingerprint block size: While this will ensure alignment, it might lead to additional space consumption for small files unless the underlying layer recognizes blocks that were not written to and optimizes by not storing these blocks.
2. Process data items in multiple passes: In the first pass, process large files in the first pass. This increases the probability of the data blocks being aligned when used in conjunction with reserving space for the file which is multiple of the fixed block size used for fingerprinting.

3. Track data blocks being used by files as they are being written to: Order the write of files such that blocks of files larger than fingerprint block size are aligned.

In some cases, allocation is to be block aligned on the final resting place (not necessary in intermediate layers, though it may be beneficial to have). Alignment may increase the effectiveness, efficiency, and usability of the data validation procedure.

In some cases, the backup system 210 may encounter or identify an error as a result of the comparison. For example, the backup system 210 may write the threshold portion of the snapshot data and perform a fingerprint comparison to validate the threshold portion. If the comparison results in an error (e.g., the fingerprints for one or more blocks do not match), then the backup system 210 may perform various operations. In some cases, the backup system 210 may output an error message that indicates that a data object is not stored correctly at the backup system 210. The error message may indicate a location of the data object at the source data system 205, a location of the data blocks of the data object at the backup system 210, or both. In some cases, the backup system 210 may refrain from writing subsequent portions of the snapshot data until the error is corrected (e.g., the data object is read/written correctly). In such cases, because the mapping manager 240 maintains a mapping of storage locations, the backup system 210 may reread (or cause the source data system 205 to provide) the data of the data object and rewrite the data of the data object to the destination storage 235. The backup system 210 may then re-compare corresponding fingerprints. The data validation may additionally or alternatively be performed periodically and/or during or in response to a restoration or recovery operation being triggered. Thus, depending on the result of the fingerprint comparison, appropriate reporting and/or error handling routines may be invoked. The process may be repeated for all blocks of the item (e.g., data object) and for all items in the dataset that are to be validated.

In some examples, some parts of the I/O subsystem (e.g., aspects of the source data system 205 and/or the backup system 210) are external and do not provide interface that would allow the backup system 210 to compute or obtain appropriate signatures or fingerprints for the data, or do not provide mechanism to determine mapping. In such cases, the backup system may limit the scope of the validation to parts of the I/O path that offer suitable interfaces. In such cases, the backup system may identify and communicate what is validated and also provide appropriate reports to capture what is and is not validated.

In some cases, the backup system 210 may be configured with custom logic to skip when a data item of mapping is not found or has unexpected value. An error handler 250 (e.g., which may implement a mismatch handler function) may be configured in a manner such that it has information about source and target data block descriptors that the function may include in logs or validation reports (and possibly generate alerts). If the validation process takes a while to complete, the function may include progress reporting and/or check for potential pause/cancellation of the validation job.

Accordingly, the techniques described herein support comparing signatures of the data to validate data correctness across multiple distinct and independent components of an I/O subsystem. In some cases, each component may have a different architecture/interface and may lack the mechanism to compute/propagate signatures. Data may be transformed in one or more layers (e.g., filesystem will store a file as blocks in a block device). Further, error handling and propagation may be used to report any inconsistencies. The techniques described herein support validation spanning multiple components in a I/O subsystem. The backup system 210 may handle data abstraction/virtualization by computing mapping at each layer/component. The backup manager may deal with distinct storage architectures (file/object/block) and source and target systems. The backup system 210 may be configured to report back specific blocks in the data item for which mismatch is detected. Further, the backup system 210 may use identical signature schemes (e.g., fingerprint schemes) at first and last components, and intermediate components may or may not compute signatures. Moreover, the backup system 210 may enforce generic mechanisms across subsystems for overall validation logic.

Figure 3:
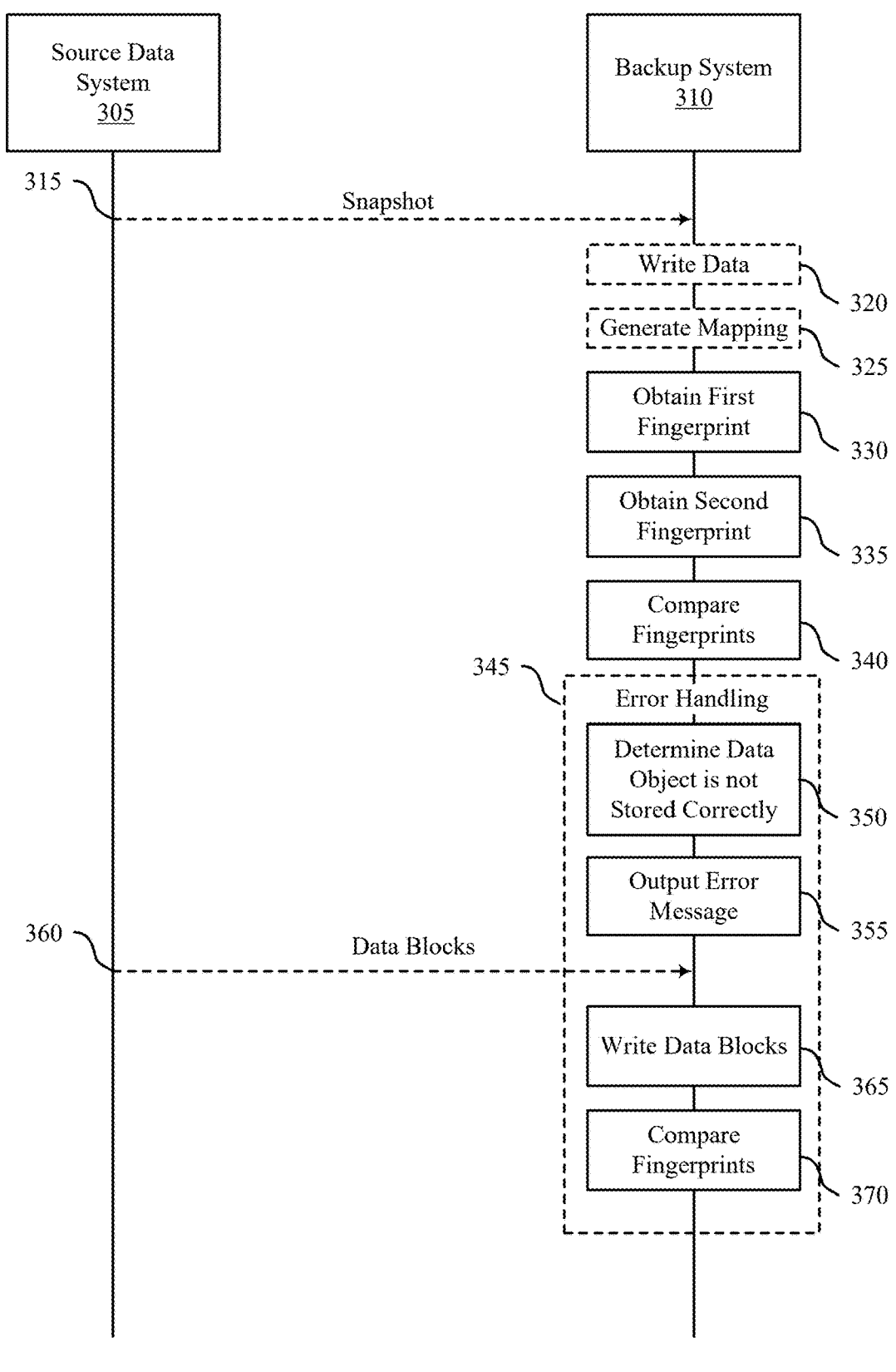
FIG. 3 shows an example of a process flow that supports end-to-end data validation for backup systems in accordance with aspects of the present disclosure.

FIG. 3 shows an example of a process flow 300 that supports end-to-end data validation for backup systems in accordance with aspects of the present disclosure. The process flow 300 includes a source data system 305 and a backup system 310, which may be examples of the corresponding devices and system as described herein with respect to FIGS. 1 and 2. Alternative examples of the following may be implemented, where some operations are performed in a different order than described or are not performed at all. In some cases, operations may include additional features not mentioned below, or further operations may be added. Although the source data system 305 and the backup system 310 are shown performing the operations of the process flow 300, some aspects of some operations may also be performed by one or more other components or systems.

At 315, the backup system 310 may obtain a snapshot from the source data system 305. The backup system 310 may cause the source data system 305 to generate the snapshot, and read or receive the snapshot data from the source data system 305.

At 320, the backup system 310 may write the snapshot data (at least partially) to a storage location (e.g., destination storage). At 325, the backup system 310 may generate a mapping between data objects of the source data system and data blocks in a backup system. In some examples, the mapping may be generated by interacting with sources data system, backup data system, and intermediate components/layers. Optionally the mapping may be persisted for subsequent use by data validator and/or other components of the backup system.

At 330, the backup system 310 may obtain a first fingerprint of one or more first data blocks obtained from the source data system 305. The one or more first data blocks may correspond to one or more data objects and are in accordance with a first storage format associated with the source data system 305. The first fingerprint may be generated by the source data system 305 and/or by an aspect in an I/O path in the backup system 310. At 335, the backup system 310 may obtain, a second fingerprint of one or more second data blocks as stored in the backup system 310, wherein the one or more second data blocks correspond to the one or more data objects and are stored in the backup system 310 in accordance with a second storage format. In some cases, the first storage format of the source data system a local file storage format, a network file storage format, or an object storage format, and each of the one or more data objects is a respective file. In such cases, the backup system 310 may be an example of or may store the data to a block device storing data of each respective file to one or more blocks in the block device. Additionally, or alternatively, the first storage format of the source data system 305 is local file storage format, and each of the one or more data objects is a respective file. In such cases, the second storage format of the backup system 310 is a local file storage format, a network file storage format, or an object storage format, and the backup system 310 includes (or accesses) a storage cluster comprising a plurality of storage devices that are accessed using the network file storage format.

A first loop construct (e.g., iterator function) may be configured to iterate through fingerprints corresponding to the first data blocks of a set of data objects of the source data system, and a second loop construct (e.g., loop construct) may be configured to iterate through fingerprints associated with the second data blocks corresponding to the set of source data objects in the backup system. In some examples, the first data blocks of the set of data objects of the source data system are contiguous, and the second data blocks corresponding to the set of data objects in the backup system are non-contiguous. Also the fingerprint of the data objects in source and backup data systems may be organized differently in memory and/or persistent store. As a result, it is possible that the fingerprints for a set of data blocks may be contiguous for the source data system, but non-contiguous for the backup system. In such cases, the second loop construct may be configured to seek an appropriate offset for reading the fingerprint of the data objects in the backup system to a second block of the second data blocks to read a contiguous subset of the second data blocks for a first data object of the set of data objects. Further, the second data blocks corresponding to the set of data objects may be non-contiguous based at least in part on the backup system 310 supporting deduplication, sharding, or compression of data blocks obtained from the source data system. In some examples, the mapping between data objects of the source data system and data blocks in the backup system includes, for each data object in the source data system, one or more respective mappings of the data object across one or more storage components at the backup system. Additionally, or alternatively, the mapping between data objects of the source data system and data blocks in the backup system includes, for each data object in the source data system, a respective mapping between a first starting offset and a first length for the data object at the source data system to a device in the backup system, a second starting offset, and a second length of data of the data object as stored at the backup system. In some implementations mapping may be derived using a function such as a simple modulo operation or a mathematical formulae or a sophisticated consistent hash algorithm.

In some examples, the first loop construct iterates through fingerprints corresponding to the data blocks of the data items source system. The data blocks in the source data system may or may not be contiguous, but the fingerprints correspond to the logical offsets, thus may be contiguous for a given data item. Depending on the design/layout of the (source) fingerprint storage system, the first loop construct may read data sequentially or may seek to a different offset from time to time and read data from that offset. In some cases, the source fingerprints are organized based on physical location/offset. In such cases, the logical data item offset is mapped to the source device/offset and the location where the corresponding fingerprint is stored is computed. In this case the first loop construct may seek to the appropriate offset and read the data from the location.

The second loop construct may iterate through fingerprints corresponding to the data blocks of the data items backup system. To facilitate fingerprint comparison, a mapping manager may map <source data item, data item offset> to <destination device/file/object, destination offset>. The location of the fingerprint corresponding to the destination data block is computed and the content is read. If the fingerprint is logically next to the last fingerprint read, simple advance of the iterator may be adequate. Otherwise the iterator seeks to the appropriate offset before the fingerprint of the destination block is read.

In some cases, the source data system and/or the backup system 310 may implement techniques to support data alignment. For example, the backup system 310 may perform data validation for data objects in the source data system in accordance with a multi-pass procedure that utilizes a fixed block size for fingerprints and prioritizes processing of (e.g., data validation for) data objects based on a size of the data objects of the source data system such that one or more large data objects are processed (e.g., validated) prior to one or more small data objects. The backup system 310 may reserve, in the backup system 310, storage resources for storage of data blocks for the data objects, where the multi-pass procedure and the storage resources reservation results in data alignment for the one or more data objects of the source data system. Other data alignment techniques may be implemented within the context of the present disclosure.

At 340, the backup system 310 may compare, in accordance with a mapping between data objects of the source data system and data blocks in the backup system, the first fingerprint and the second fingerprint to validate whether the one or more data objects are stored correctly at the backup system. The first fingerprint and the second fingerprint may include hash values, checksums, signatures, or the like. In some cases, the first fingerprint and the second fingerprint are compared in response to writing, to the backup system 310, a first threshold portion of data of a backup snapshot obtained from the source data system 305. In such cases, each threshold portion of the backup snapshot that is written to the backup system 310 triggers a respective set of comparisons between first fingerprints obtained for the source data system 305 and second fingerprints obtained for the backup system 310.

At 345, the backup system 310 may perform various error handling operations. For example, at 350, the backup system 310 may determine, based on the comparison, that a first data object of the one or more data objects is not stored correctly at the backup system. In such cases, at 355, the backup system 310 may output an error message indicating that the first data object is not stored correctly at the backup system. Moreover, in such cases, the backup system may refrain until the first data object is validated as stored correctly at the backup system, from writing a second threshold portion of the backup snapshot that is subsequent to the first threshold portion. In some examples, the error message is indicative of a first location of the first data object in the source data system, a second location of data corresponding to the first data object in the backup system, or both. At 360, the backup system 310 may obtain (e.g., from the source data system 305), a first set of data blocks corresponding to the first data object. At 365, the backup system 310 may write data of the first set of data blocks as a second set of data blocks at the backup system 310. At 370, the backup system may compare, to validate whether the first data object is stored correctly at the backup system, a third fingerprint of the first set of data blocks to a fourth fingerprint of the second set of data blocks. One or more operations at 345 may be repeated multiple times to ensure correctness of the backup data.

Figure 4:
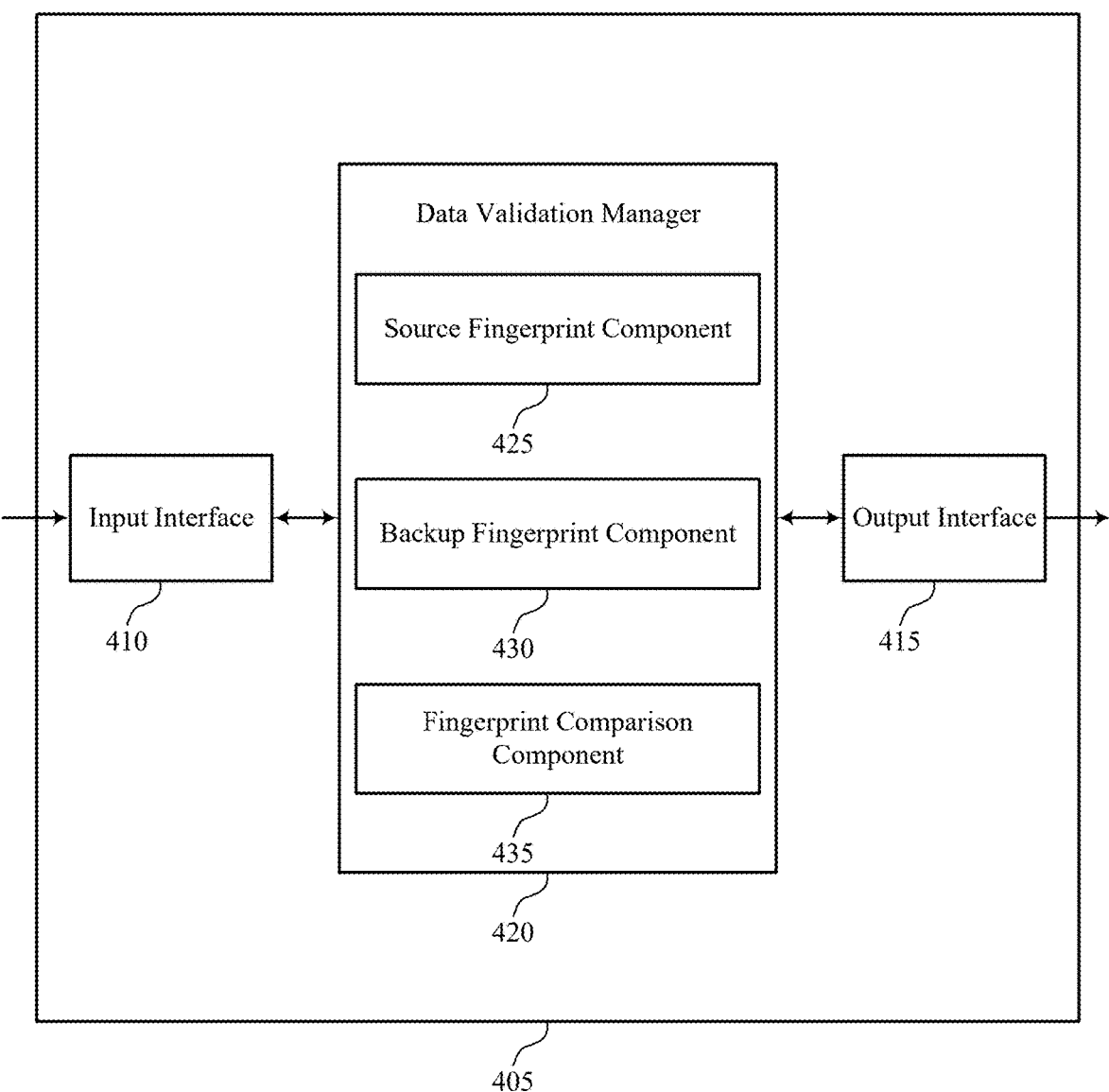
FIG. 4 shows a block diagram of an apparatus that supports end-to-end data validation for backup systems in accordance with aspects of the present disclosure.

FIG. 4 shows a block diagram 400 of a system 405 that supports end-to-end data validation for backup systems in accordance with aspects of the present disclosure. In some examples, the system 405 may be an example of aspects of one or more components described with reference to FIG. 1, such as a DMS 110. The system 405 may include an input interface 410, an output interface 415, and a data validation manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the data validation manager 420 to support end-to-end data validation for backup systems. In some cases, the input interface 410 may be a component of a network interface 625 as described with reference to FIG. 6.

The output interface 415 may manage output signaling for the system 405. For example, the output interface 415 may receive signaling from other components of the system 405, such as the data validation manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the data validation manager 420 may include a source fingerprint component 425, a backup fingerprint component 430, a fingerprint comparison component 435, or any combination thereof. In some examples, the data validation manager 420, or various components thereof, may be configured to perform various operations (e.g., receiving, monitoring, transmitting) using or otherwise in cooperation with the input interface 410, the output interface 415, or both. For example, the data validation manager 420 may receive information from the input interface 410, send information to the output interface 415, or be integrated in combination with the input interface 410, the output interface 415, or both to receive information, transmit information, or perform various other operations as described herein.

The source fingerprint component 425 may be configured as or otherwise support a means for obtaining a first fingerprint of one or more first data blocks obtained from a source data system, where the one or more first data blocks correspond to one or more data objects and are in accordance with a first storage format associated with the source data system. The backup fingerprint component 430 may be configured as or otherwise support a means for obtaining, a second fingerprint of one or more second data blocks as stored in the backup system, where the one or more second data blocks correspond to the one or more data objects and are stored in the backup system in accordance with a second storage format. The fingerprint comparison component 435 may be configured as or otherwise support a means for comparing, in accordance with a mapping between data objects of the source data system and data blocks in the backup system, the first fingerprint and the second fingerprint to validate whether the one or more data objects are stored correctly at the backup system.

Figure 5:
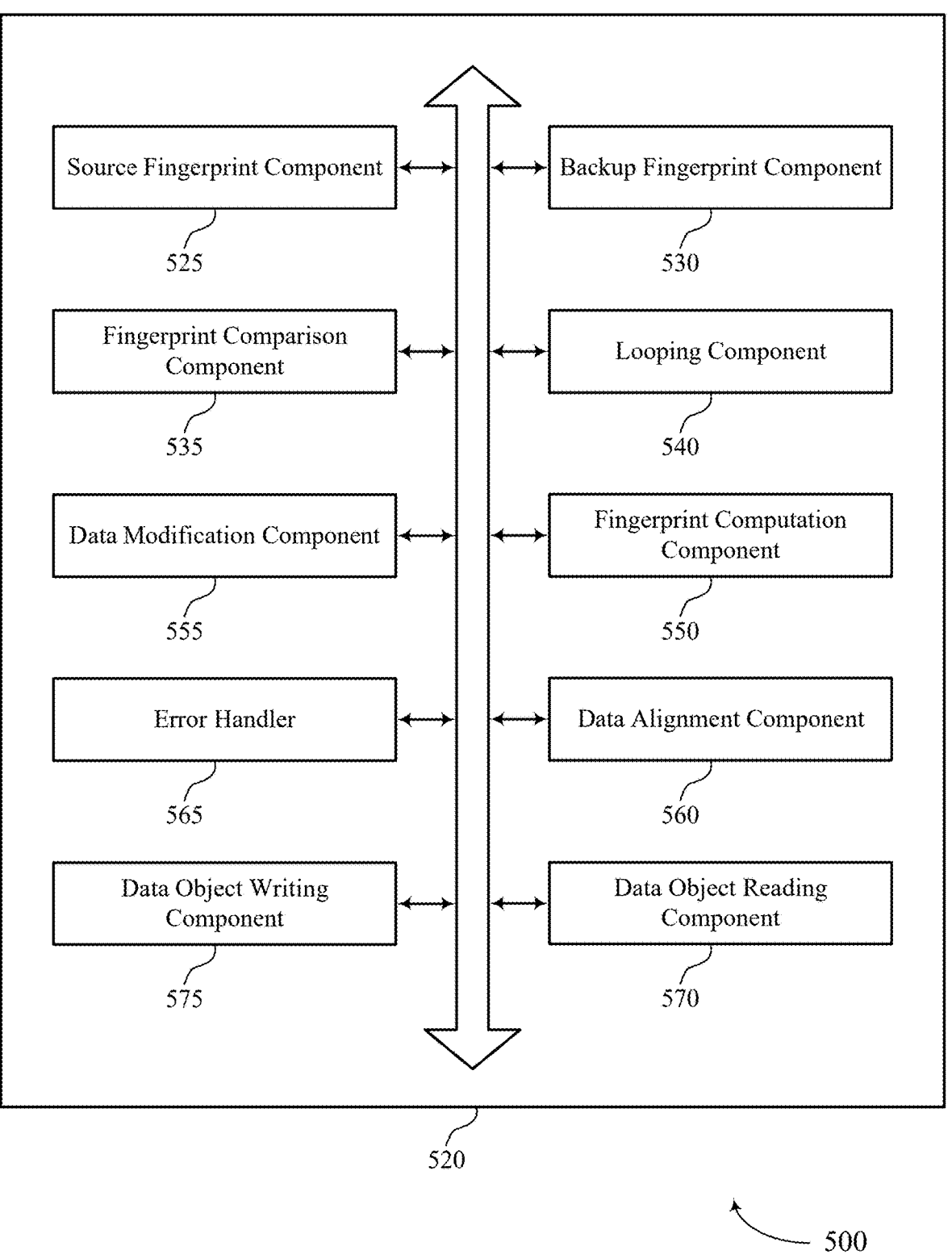
FIG. 5 shows a block diagram of a data validation manager that supports end-to-end data validation for backup systems in accordance with aspects of the present disclosure.

FIG. 5 shows a block diagram 500 of a data validation manager 520 that supports end-to-end data validation for backup systems in accordance with aspects of the present disclosure. The data validation manager 520 may be an example of aspects of a data validation manager or a data validation manager 420, or both, as described herein. The data validation manager 520, or various components thereof, may be an example of means for performing various aspects of end-to-end data validation for backup systems as described herein. For example, the data validation manager 520 may include a source fingerprint component 525, a backup fingerprint component 530, a fingerprint comparison component 535, a looping component 540, a fingerprint computation component 550, a data modification component 555, a data alignment component 560, an error handler 565, a data object reading component 570, a data object writing component 575, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The source fingerprint component 525 may be configured as or otherwise support a means for obtaining a first fingerprint of one or more first data blocks obtained from a source data system, where the one or more first data blocks correspond to one or more data objects and are in accordance with a first storage format associated with the source data system. The backup fingerprint component 530 may be configured as or otherwise support a means for obtaining, a second fingerprint of one or more second data blocks as stored in the backup system, where the one or more second data blocks correspond to the one or more data objects and are stored in the backup system in accordance with a second storage format. The fingerprint comparison component 535 may be configured as or otherwise support a means for comparing, in accordance with a mapping between data objects of the source data system and data blocks in the backup system, the first fingerprint and the second fingerprint to validate whether the one or more data objects are stored correctly at the backup system.

In some examples, the looping component 540 may be configured as or otherwise support a means for using a first looping construct and a second looping construct to identify the first fingerprint and the second fingerprint for comparison, where the first looping construct is configured to iterate through first fingerprints corresponding to first data blocks in the source data system that correspond to a set of data objects, and where the second looping construct is configured to iterate through second fingerprints corresponding to second data blocks corresponding to the set of data objects in the backup system in accordance with the mapping.

In some examples, the first fingerprints corresponding to the first data blocks of the source data system are contiguous. In some examples, the second fingerprints corresponding to the second data blocks in the backup system are non-contiguous. In some examples, the second looping construct is configured to seek to one of the second fingerprints to read a contiguous subset of the second fingerprints corresponding to the second data blocks.

In some examples, the second fingerprints corresponding to the second data blocks are non-contiguous based on the backup system supporting deduplication, sharding, or compression of data blocks obtained from the source data system.

In some examples, comparing the first fingerprint and the second fingerprint occurs in response to writing, to the backup system, a first threshold portion of data of a backup snapshot obtained from the source data system.

In some examples, each threshold portion of the backup snapshot that is written to the backup system triggers a respective set of comparisons between first fingerprints obtained for the source data system and second fingerprints obtained for the backup system.

In some examples, the error handler 565 may be configured as or otherwise support a means for determining, based on the comparing, that a first data object of the one or more data objects is not stored correctly at the backup system. In some examples, the data object reading component 570 may be configured as or otherwise support a means for obtaining, from the source data system, a first set of data blocks corresponding to the first data object. In some examples, the data object writing component 575 may be configured as or otherwise support a means for writing, to the backup system, data of the first set of data blocks as a second set of data blocks at the backup system. In some examples, the fingerprint comparison component 535 may be configured as or otherwise support a means for comparing, to validate whether the first data object is stored correctly at the backup system a third fingerprint of the first set of data blocks to a fourth fingerprint of the second set of data blocks.

In some examples, the error handler 565 may be configured as or otherwise support a means for refraining, until the first data object is validated as stored correctly at the backup system, from writing a second threshold portion of the backup snapshot that is subsequent to the first threshold portion.

In some examples, the error handler 565 may be configured as or otherwise support a means for outputting an error message indicating that the first data object is not stored correctly at the backup system, where the error message is indicative of a first location of the first data object in the source data system, a second location of data corresponding to the first data object in the backup system, or both.

In some examples, the first storage format of the source data system is a local file storage format, a network file storage format, or an object storage format, where each of the one or more data objects is a respective file. In some examples, the backup system is a block device storing data of each respective file to one or more blocks.

In some examples, the first storage format of the source data system is a local file storage format, where each of the one or more data objects is a respective file. In some examples, the second storage format of the backup system is a local file storage format, a network file storage format, or an object storage format, where the backup system includes a storage cluster including a set of multiple storage devices that are accessed using the network file storage format.

In some examples, the mapping between data objects of the source data system and data blocks in the backup system includes, for each data object in the source data system, a respective mapping between a first starting offset and a first length for the data object at the source data system to a device in the backup system, a second starting offset, and a second length of data of the data object as stored at the backup system.

In some examples, the mapping between data objects of the source data system and data blocks in the backup system includes, for each data object in the source data system, one or more respective mappings of the data object across one or more storage components at the backup system. In some examples, each of the one or more respective mappings may correspond to a respective mapping function, a respective block size, or both corresponding to a respective storage component of the one or more storage components.

In some examples, to support obtaining the second fingerprint, the fingerprint computation component 550 may be configured as or otherwise support a means for computing the second fingerprint prior to encrypting or compressing data of the one or more second data blocks for storage at the backup system. In some examples, to support obtaining the second fingerprint, the data modification component 555 may be configured as or otherwise support a means for decompressing the data of the one or more second data blocks, decrypting the one or more second data blocks, or both prior to computing the second fingerprint.

In some examples, the data alignment component 560 may be configured as or otherwise support a means for performing data validation for data objects in the source data system in accordance with a multi-pass procedure that utilizes a fixed block size for fingerprints and prioritizes processing of (e.g., data validation for) data objects based on a size of the data objects of the source data system such that one or more large data objects are processed (e.g., validated) prior to one or more small data objects. In some examples, the data alignment component 560 may be configured as or otherwise support a means for reserving, in the backup system, storage resources for storage of data blocks for the data objects, where the multi-pass procedure and the storage resources reservation results in data alignment for the one or more data objects of the source data system.

Figure 6:
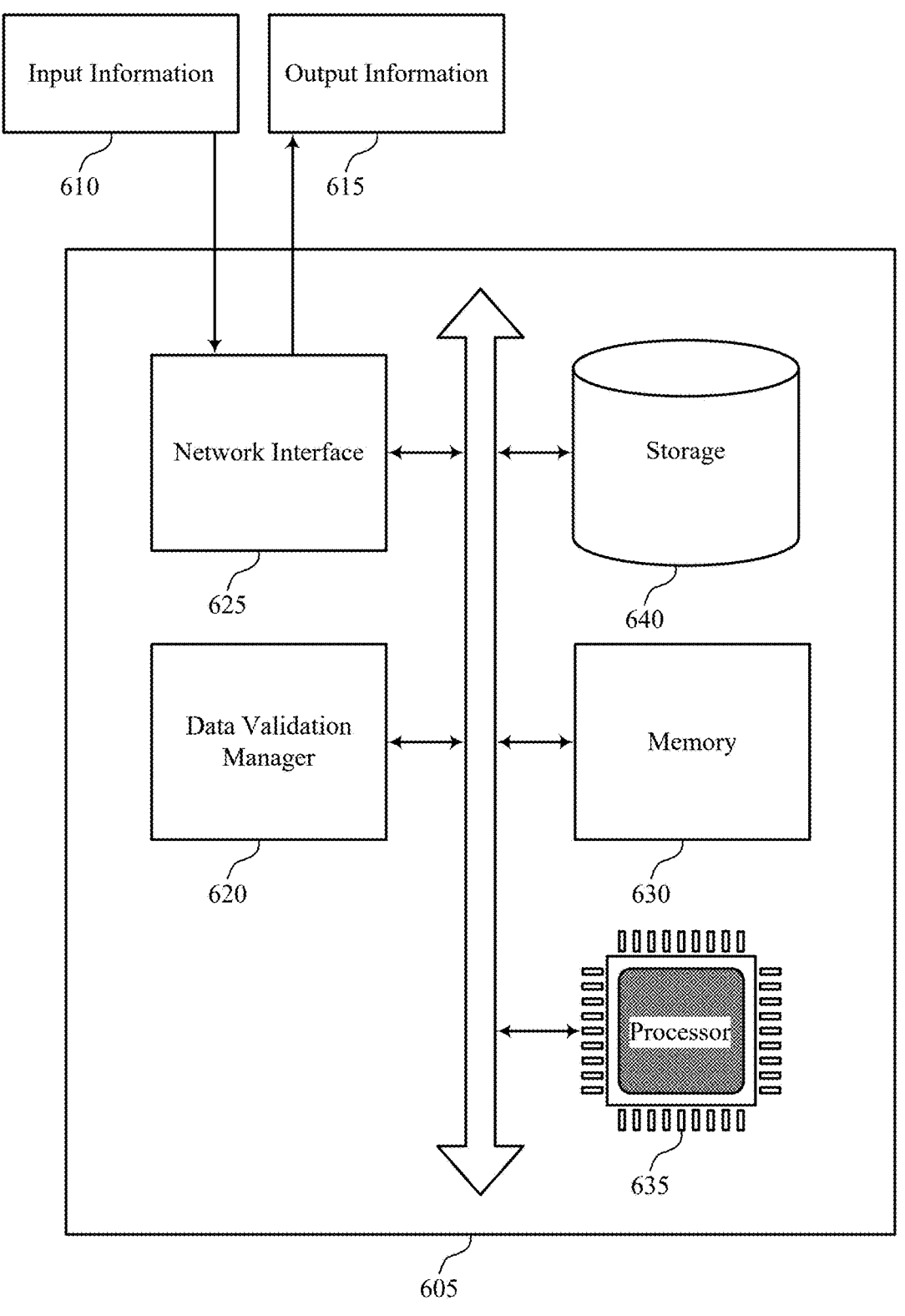
FIG. 6 shows a diagram of a system including a device that supports end-to-end data validation for backup systems in accordance with aspects of the present disclosure.

FIG. 6 shows a block diagram 600 of a system 605 that supports end-to-end data validation for backup systems in accordance with aspects of the present disclosure. The system 605 may be an example of or include components of a system 405 as described herein. The system 605 may include components for data management, including components such as a data validation manager 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting end-to-end data validation for backup systems). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the data validation manager 620 may be configured as or otherwise support a means for obtaining a first fingerprint of one or more first data blocks obtained from a source data system, where the one or more first data blocks correspond to one or more data objects and are in accordance with a first storage format associated with the source data system. The data validation manager 620 may be configured as or otherwise support a means for obtaining, a second fingerprint of one or more second data blocks as stored in the backup system, where the one or more second data blocks correspond to the one or more data objects and are stored in the backup system in accordance with a second storage format. The data validation manager 620 may be configured as or otherwise support a means for comparing, in accordance with a mapping between data objects of the source data system and data blocks in the backup system, the first fingerprint and the second fingerprint to validate whether the one or more data objects are stored correctly at the backup system.

By including or configuring the data validation manager 620 in accordance with examples as described herein, the system 605 may support techniques for end-to-end data validation for backup systems, which may provide one or more benefits such as, for example, improved data security (e.g., due to data validations) and more efficient utilization of processing resources (e.g., by performing data validation in a granular manner), among other possibilities.

FIG. 7 shows a flowchart illustrating a method 700 that supports end-to-end data validation for backup systems in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include obtaining a first fingerprint of one or more first data blocks obtained from a source data system, where the one or more first data blocks correspond to one or more data objects and are in accordance with a first storage format associated with the source data system. The operations of 705 may be performed in accordance with examples as disclosed herein. In some examples, aspects of the operations of 705 may be performed by a source fingerprint component 525 as described with reference to FIG. 5.

At 710, the method may include obtaining, a second fingerprint of one or more second data blocks as stored in a backup system, where the one or more second data blocks correspond to the one or more data objects and are stored in the backup system in accordance with a second storage format. The operations of 710 may be performed in accordance with examples as disclosed herein. In some examples, aspects of the operations of 710 may be performed by a backup fingerprint component 530 as described with reference to FIG. 5.

At 715, the method may include comparing, in accordance with a mapping between data objects of the source data system and data blocks in the backup system, the first fingerprint and the second fingerprint to validate whether the one or more data objects are stored correctly at the backup system. The operations of 715 may be performed in accordance with examples as disclosed herein. In some examples, aspects of the operations of 715 may be performed by a fingerprint comparison component 535 as described with reference to FIG. 5.

FIG. 8 shows a flowchart illustrating a method 800 that supports end-to-end data validation for backup systems in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include using a first looping construct and a second looping construct to identify a first fingerprint and a second fingerprint for comparison, where the first looping construct is configured to iterate through first fingerprints corresponding to first data blocks in a source data system that correspond to a set of data objects, and where the second looping construct is configured to iterate through second fingerprints corresponding to second data blocks corresponding to the set of data objects in a backup system in accordance with a mapping. The operations of 805 may be performed in accordance with examples as disclosed herein. In some examples, aspects of the operations of 805 may be performed by a looping component 540 as described with reference to FIG. 5.

At 810, the method may include obtaining the first fingerprint of one or more first data blocks obtained from the source data system, where the one or more first data blocks correspond to one or more data objects and are in accordance with a first storage format associated with the source data system. The operations of 810 may be performed in accordance with examples as disclosed herein. In some examples, aspects of the operations of 810 may be performed by a source fingerprint component 525 as described with reference to FIG. 5.

At 815, the method may include obtaining, the second fingerprint of one or more second data blocks as stored in the backup system, where the one or more second data blocks correspond to the one or more data objects and are stored in the backup system in accordance with a second storage format. The operations of 815 may be performed in accordance with examples as disclosed herein. In some examples, aspects of the operations of 815 may be performed by a backup fingerprint component 530 as described with reference to FIG. 5.

At 820, the method may include comparing, in accordance with a mapping between data objects of the source data system and data blocks in the backup system, the first fingerprint and the second fingerprint to validate whether the one or more data objects are stored correctly at the backup system. The operations of 820 may be performed in accordance with examples as disclosed herein. In some examples, aspects of the operations of 820 may be performed by a fingerprint comparison component 535 as described with reference to FIG. 5.

FIG. 9 shows a flowchart illustrating a method 900 that supports end-to-end data validation for backup systems in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include obtaining a first fingerprint of one or more first data blocks obtained from a source data system, where the one or more first data blocks correspond to one or more data objects and are in accordance with a first storage format associated with the source data system. The operations of 905 may be performed in accordance with examples as disclosed herein. In some examples, aspects of the operations of 905 may be performed by a source fingerprint component 525 as described with reference to FIG. 5.

At 910, the method may include obtaining, a second fingerprint of one or more second data blocks as stored in the backup system, where the one or more second data blocks correspond to the one or more data objects and are stored in the backup system in accordance with a second storage format. The operations of 910 may be performed in accordance with examples as disclosed herein. In some examples, aspects of the operations of 910 may be performed by a backup fingerprint component 530 as described with reference to FIG. 5.

At 915, the method may include comparing, in accordance with a mapping between data objects of the source data system and data blocks in the backup system, the first fingerprint and the second fingerprint to validate whether the one or more data objects are stored correctly at the backup system. The operations of 915 may be performed in accordance with examples as disclosed herein. In some examples, aspects of the operations of 915 may be performed by a fingerprint comparison component 535 as described with reference to FIG. 5.

At 920, the method may include determining, based on the comparing, that a first data object of the one or more data objects is not stored correctly at the backup system. The operations of 920 may be performed in accordance with examples as disclosed herein. In some examples, aspects of the operations of 920 may be performed by an error handler 565 as described with reference to FIG. 5.

At 925, the method may include obtaining, from the source data system, a first set of data blocks corresponding to the first data object. The operations of 925 may be performed in accordance with examples as disclosed herein. In some examples, aspects of the operations of 925 may be performed by a data object reading component 570 as described with reference to FIG. 5.

At 930, the method may include writing, to the backup system, data of the first set of data blocks as a second set of data blocks at the backup system. The operations of 930 may be performed in accordance with examples as disclosed herein. In some examples, aspects of the operations of 930 may be performed by a data object writing component 575 as described with reference to FIG. 5.

At 935, the method may include comparing, to validate whether the first data object is stored correctly at the backup system a third fingerprint of the first set of data blocks to a fourth fingerprint of the second set of data blocks. The operations of 935 may be performed in accordance with examples as disclosed herein. In some examples, aspects of the operations of 935 may be performed by a fingerprint comparison component 535 as described with reference to FIG. 5.

A method by an apparatus is described. The method may include obtaining a first fingerprint of one or more first data blocks obtained from a source data system, where the one or more first data blocks correspond to one or more data objects and are in accordance with a first storage format associated with the source data system, obtaining, a second fingerprint of one or more second data blocks as stored in a backup system, where the one or more second data blocks correspond to the one or more data objects and are stored in the backup system in accordance with a second storage format, and comparing, in accordance with a mapping between data objects of the source data system and data blocks in the backup system, the first fingerprint and the second fingerprint to validate whether the one or more data objects are stored correctly at the backup system.

An apparatus is described. The apparatus may include one or more memories storing processor executable code, and one or more processors coupled with the one or more memories. The one or more processors may individually or collectively be operable to execute the code to cause the apparatus to obtain a first fingerprint of one or more first data blocks obtained from a source data system, where the one or more first data blocks correspond to one or more data objects and are in accordance with a first storage format associated with the source data system, obtain, a second fingerprint of one or more second data blocks as stored in a backup system, where the one or more second data blocks correspond to the one or more data objects and are stored in the backup system in accordance with a second storage format, and compare, in accordance with a mapping between data objects of the source data system and data blocks in the backup system, the first fingerprint and the second fingerprint to validate whether the one or more data objects are stored correctly at the backup system.

Another apparatus is described. The apparatus may include means for obtaining a first fingerprint of one or more first data blocks obtained from a source data system, where the one or more first data blocks correspond to one or more data objects and are in accordance with a first storage format associated with the source data system, means for obtaining, a second fingerprint of one or more second data blocks as stored in a backup system, where the one or more second data blocks correspond to the one or more data objects and are stored in the backup system in accordance with a second storage format, and means for comparing, in accordance with a mapping between data objects of the source data system and data blocks in the backup system, the first fingerprint and the second fingerprint to validate whether the one or more data objects are stored correctly at the backup system.

A non-transitory computer-readable medium storing code is described. The code may include instructions executable by one or more processors to obtain a first fingerprint of one or more first data blocks obtained from a source data system, where the one or more first data blocks correspond to one or more data objects and are in accordance with a first storage format associated with the source data system, obtain, a second fingerprint of one or more second data blocks as stored in a backup system, where the one or more second data blocks correspond to the one or more data objects and are stored in the backup system in accordance with a second storage format, and compare, in accordance with a mapping between data objects of the source data system and data blocks in the backup system, the first fingerprint and the second fingerprint to validate whether the one or more data objects are stored correctly at the backup system.

Some examples of the method, apparatus, and non-transitory computer-readable medium described herein may further include operations, features, means, or instructions for using a first looping construct and a second looping construct to identify the first fingerprint and the second fingerprint for comparison, where the first looping construct may be configured to iterate through first fingerprints corresponding to first data blocks in the source data system that correspond to a set of data objects, and where the second looping construct may be configured to iterate through second fingerprints corresponding to second data blocks corresponding to the set of data objects in the backup system in accordance with the mapping.

In some examples of the method, apparatus, and non-transitory computer-readable medium described herein, the first fingerprints corresponding to the first data blocks of the source data system may be contiguous, the second fingerprints corresponding to the second data blocks cos in the backup system may be non-contiguous, and the second looping construct may be configured to seek to one of the second fingerprints to read a contiguous subset of the second fingerprints corresponding to the second data blocks.

In some examples of the method, apparatus, and non-transitory computer-readable medium described herein, the second fingerprints corresponding to the second data blocks may be non-contiguous based on the backup system supporting deduplication, sharding, or compression of data blocks obtained from the source data system.

Some examples of the method, apparatus, and non-transitory computer-readable medium described herein may further include operations, features, means, or instructions for comparing the first fingerprint and the second fingerprint occurs in response to writing, to the backup system, a first threshold portion of data of a backup snapshot obtained from the source data system.

In some examples of the method, apparatus, and non-transitory computer-readable medium described herein, each threshold portion of the backup snapshot that may be written to the backup system triggers a respective set of comparisons between first fingerprints obtained for the source data system and second fingerprints obtained for the backup system.

Some examples of the method, apparatus, and non-transitory computer-readable medium described herein may further include operations, features, means, or instructions for determining, based on the comparing, that a first data object of the one or more data objects may be not stored correctly at the backup system, obtaining, from the source data system, a first set of data blocks corresponding to the first data object, writing, to the backup system, data of the first set of data blocks as a second set of data blocks at the backup system, and comparing, to validate whether the first data object may be stored correctly at the backup system a third fingerprint of the first set of data blocks to a fourth fingerprint of the second set of data blocks.

Some examples of the method, apparatus, and non-transitory computer-readable medium described herein may further include operations, features, means, or instructions for refraining, until the first data object may be validated as stored correctly at the backup system, from writing a second threshold portion of the backup snapshot that may be subsequent to the first threshold portion.

Some examples of the method, apparatus, and non-transitory computer-readable medium described herein may further include operations, features, means, or instructions for outputting an error message indicating that the first data object may be not stored correctly at the backup system, where the error message may be indicative of a first location of the first data object in the source data system, a second location of data corresponding to the first data object in the backup system, or both.

In some examples of the method, apparatus, and non-transitory computer-readable medium described herein, the first storage format of the source data system may be a local file storage format, a network file storage format, or an object storage format, where each of the one or more data objects may be a respective file and the backup system may be a block device storing data of each respective file to one or more blocks.

In some examples of the method, apparatus, and non-transitory computer-readable medium described herein, the first storage format of the source data system may be a local, where each of the one or more data objects may be a respective file and the second storage format of the backup system may be a local file storage format, a network file storage format, or an object storage format, where the backup system includes a storage cluster including a set of multiple storage devices that may be accessed using the network file storage format.

In some examples of the method, apparatus, and non-transitory computer-readable medium described herein, the mapping between data objects of the source data system and data blocks in the backup system includes, for each data object in the source data system, a respective mapping between a first starting offset and a first length for the data object at the source data system to a device in the backup system, a second starting offset, and a second length of data of the data object as stored at the backup system.

In some examples of the method, apparatus, and non-transitory computer-readable medium described herein, the mapping between data objects of the source data system and data blocks in the backup system includes, for each data object in the source data system, one or more respective mappings of the data object across one or more storage components at the backup system and each of the one or more respective mappings may correspond to a respective mapping function, a respective block size, or both corresponding to a respective storage component of the one or more storage components.

In some examples of the method, apparatus, and non-transitory computer-readable medium described herein, operations, features, means, or instructions for obtaining the second fingerprint may include operations, features, means, or instructions for computing the second fingerprint prior to encrypting or compressing data of the one or more second data blocks for storage at the backup system or operations, features, means, or instructions for decompressing the data of the one or more second data blocks, decrypting the one or more second data blocks, or both prior to computing the second fingerprint.

Some examples of the method, apparatus, and non-transitory computer-readable medium described herein may further include operations, features, means, or instructions for performing data validation for data objects in the source data system in accordance with a multi-pass procedure that utilizes a fixed block size for fingerprints and prioritizes processing of (e.g., data validation for) data objects based on a size of the data objects of the source data system such that one or more large data objects may be processed (e.g., validated) prior to one or more small data objects and reserving, in the backup system, storage resources for storage of data blocks for the data objects, where the multi-pass procedure and the storage resources reservation results in data alignment for the one or more data objects of the source data system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
writing, to a backup system, a first threshold portion of data of a backup snapshot obtained from a source data system;
obtaining a first fingerprint of one or more first data blocks obtained from the source data system, wherein the one or more first data blocks correspond to one or more data objects and are in accordance with a first storage format associated with the source data system;
obtaining a second fingerprint of one or more second data blocks as stored in the backup system, wherein the one or more second data blocks correspond to the one or more data objects and are stored in the backup system in accordance with a second storage format;
comparing, in accordance with a mapping between data objects of the source data system and data blocks in the backup system and in response to writing the first threshold portion of data, the first fingerprint and the second fingerprint to validate whether the one or more data objects are stored correctly at the backup system;
determining, based at least in part on the comparing, that a first data object of the one or more data objects is not stored correctly at the backup system;
obtaining, from the source data system, a first set of data blocks corresponding to the first data object;
writing, to the backup system, data of the first set of data blocks as a second set of data blocks at the backup system; and
comparing, to validate whether the first data object is stored correctly at the backup system, a third fingerprint of the first set of data blocks to a fourth fingerprint of the second set of data blocks.

2. The method of claim 1, further comprising:

using a first looping construct and a second looping construct to identify the first fingerprint and the second fingerprint for comparison, wherein the first looping construct is configured to iterate through first fingerprints corresponding to first data blocks in the source data system that correspond to a set of data objects, and wherein the second looping construct is configured to iterate through second fingerprints corresponding to second data blocks corresponding to the set of data objects in the backup system in accordance with the mapping.

3. The method of claim 2, wherein:

the first fingerprints corresponding to the first data blocks of the source data system are contiguous;

the second fingerprints corresponding to the second data blocks in the backup system are non-contiguous; and the second looping construct is configured to seek to one of the second fingerprints to read a contiguous subset of the second fingerprints corresponding to the second data blocks.

4. The method of claim 3, wherein the second fingerprints corresponding to the second data blocks are non-contiguous based at least in part on the backup system supporting deduplication, sharding, or compression of data blocks obtained from the source data system.

5. The method of claim 1, wherein each threshold portion of the backup snapshot that is written to the backup system triggers a respective set of comparisons between first fingerprints obtained for the source data system and second fingerprints obtained for the backup system.

6. The method of claim 1, further comprising:

refraining, until the first data object is validated as stored correctly at the backup system, from writing a second threshold portion of the backup snapshot that is subsequent to the first threshold portion.

7. The method of claim 1, further comprising:

outputting an error message indicating that the first data object is not stored correctly at the backup system, wherein the error message is indicative of a first location of the first data object in the source data system, a second location of data corresponding to the first data object in the backup system, or both.

8. The method of claim 1, wherein:

the first storage format of the source data system is a local file storage format, a network file storage format, or an object storage format, wherein each of the one or more data objects is a respective file; and the backup system is a block device storing data of each respective file to one or more blocks.

9. The method of claim 1, wherein:

the first storage format of the source data system is a local file storage format, wherein each of the one or more data objects is a respective file; and the second storage format of the backup system is a local file storage format, a network file storage format, or an object storage format, wherein the backup system comprises a storage cluster comprising a plurality of storage devices that are accessed using the network file storage format.

10. The method of claim 1, wherein the mapping between data objects of the source data system and data blocks in the backup system comprises, for each data object in the source data system, a respective mapping between a first starting offset and a first length for the data object at the source data system to a device in the backup system, a second starting offset, and a second length of data of the data object as stored at the backup system.

11. The method of claim 1, wherein:

the mapping between data objects of the source data system and data blocks in the backup system comprises, for each data object in the source data system, one or more respective mappings of the data object across one or more storage components at the backup system, and each of the one or more respective mappings may correspond to a respective mapping function, a respective block size, or both corresponding to a respective storage component of the one or more storage components.

12. The method of claim 1, wherein obtaining the second fingerprint comprises:

computing the second fingerprint prior to encrypting or compressing data of the one or more second data blocks for storage at the backup system; or decompressing the data of the one or more second data blocks, decrypting the one or more second data blocks, or both prior to computing the second fingerprint.

13. The method of claim 1, further comprising:

performing data validation for data objects in the source data system in accordance with a multi-pass procedure that utilizes a fixed block size for fingerprints and prioritizes processing of data objects based on a size of the data objects of the source data system such that one or more large data objects are processed prior to one or more small data objects; and reserving, in the backup system, storage resources for storage of data blocks for the data objects, wherein the multi-pass procedure and the storage resources reservation results in data alignment for the one or more data objects of the source data system.

14. An apparatus, comprising:

one or more memories storing processor-executable code; and one or more processors coupled with the one or more memories and individually or collectively operable to execute the code to cause the apparatus to:

write, to a backup system, a first threshold portion of data of a backup snapshot obtained from a source data system;

obtain a first fingerprint of one or more first data blocks obtained from the source data system, wherein the one or more first data blocks correspond to one or more data objects and are in accordance with a first storage format associated with the source data system;

obtain a second fingerprint of one or more second data blocks as stored in the backup system, wherein the one or more second data blocks correspond to the one or more data objects and are stored in the backup system in accordance with a second storage format;

compare, in accordance with a mapping between data objects of the source data system and data blocks in the backup system and in response to writing the first threshold portion of data, the first fingerprint and the second fingerprint to validate whether the one or more data objects are stored correctly at the backup system;

determine, based at least in part on the comparing, that a first data object of the one or more data objects is not stored correctly at the backup system;

obtain, from the source data system, a first set of data blocks corresponding to the first data object;

write, to the backup system, data of the first set of data blocks as a second set of data blocks at the backup system; and compare, to validate whether the first data object is stored correctly at the backup system, a third fingerprint of the first set of data blocks to a fourth fingerprint of the second set of data blocks.

15. The apparatus of claim 14, wherein the one or more processors are individually or collectively further operable to execute the code to cause the apparatus to:

use a first looping construct and a second looping construct to identify the first fingerprint and the second fingerprint for comparison, wherein the first looping construct is configured to iterate through first fingerprints corresponding to first data blocks in the source data system that correspond to a set of data objects, and wherein the second looping construct is configured to iterate through second fingerprints corresponding to second data blocks corresponding to the set of data objects in the backup system in accordance with the mapping.

16. The apparatus of claim 15, wherein:

the first fingerprints corresponding to the first data blocks of the source data system are contiguous;

the second fingerprints corresponding to the second data blocks in the backup system are non-contiguous; and the second looping construct is configured to seek to one of the second fingerprints to read a contiguous subset of the second fingerprints corresponding to the second data blocks.

17. A non-transitory computer-readable medium storing code, the code comprising instructions executable by one or more processors to:

write, to a backup system, a first threshold portion of data of a backup snapshot obtained from a source data system;

obtain a first fingerprint of one or more first data blocks obtained from the source data system, wherein the one or more first data blocks correspond to one or more data objects and are in accordance with a first storage format associated with the source data system;

obtain a second fingerprint of one or more second data blocks as stored in the backup system, wherein the one or more second data blocks correspond to the one or more data objects and are stored in the backup system in accordance with a second storage format;

compare, in accordance with a mapping between data objects of the source data system and data blocks in the backup system and in response to writing the first threshold portion of data, the first fingerprint and the second fingerprint to validate whether the one or more data objects are stored correctly at the backup system;

determine, based at least in part on the comparing, that a first data object of the one or more data objects is not stored correctly at the backup system;

obtain, from the source data system, a first set of data blocks corresponding to the first data object;

write, to the backup system, data of the first set of data blocks as a second set of data blocks at the backup system; and compare, to validate whether the first data object is stored correctly at the backup system, a third fingerprint of the first set of data blocks to a fourth fingerprint of the second set of data blocks.

18. The non-transitory computer-readable medium of claim 17, wherein the instructions are further executable by the one or more processors to:

use a first looping construct and a second looping construct to identify the first fingerprint and the second fingerprint for comparison, wherein the first looping construct is configured to iterate through first fingerprints corresponding to first data blocks in the source data system that correspond to a set of data objects, and wherein the second looping construct is configured to iterate through second fingerprints corresponding to second data blocks corresponding to the set of data objects in the backup system in accordance with the mapping.

\* \* \* \* \*